United States Patent [19]

Hazan

[11] 4,338,235
[45] Jul. 6, 1982

[54] ELECTROCOATING COMPOSITION WITH POLYHYDROXYAMINE AND ACRYLIC OR METHACRYLIC POLYMERS

[75] Inventor: Isidor Hazan, Clementon, N.J.

[73] Assignee: E. I. Du Pont de Nemours and Company, Wilmington, Del.

[21] Appl. No.: 220,952

[22] Filed: Dec. 29, 1980

Related U.S. Application Data

[63] Continuation-in-part of Ser. No. 106,256, Dec. 21, 1979, abandoned.

[51] Int. Cl.$^3$ .................... C08L 29/00; C08L 39/00
[52] U.S. Cl. ............................. 524/504; 204/181 C; 525/65; 525/109; 525/118; 525/217; 525/451; 525/530; 524/901
[58] Field of Search ............... 525/217, 65, 109, 118, 525/451, 530; 260/29.4 UA, 29.6 MN, 29.6 TA, 29.2 EP; 204/181 C

[56] References Cited

U.S. PATENT DOCUMENTS

| | | | |
|---|---|---|---|
| 2,866,779 | 12/1958 | Pritchard et al. | 260/82.1 |
| 3,227,672 | 1/1966 | Fertig et al. | 260/29.6 |
| 3,385,839 | 5/1968 | Honig et al. | 260/80.73 |
| 3,617,458 | 11/1971 | Brockman | 204/181 |
| 3,869,366 | 3/1975 | Suzuki et al. | 204/181 |
| 3,983,059 | 9/1976 | Sekmakas | 260/29.4 UA |
| 3,988,281 | 10/1976 | Minami et al. | 260/29.6 TA |
| 4,115,227 | 9/1978 | Hazan | 204/181 C |
| 4,133,790 | 1/1979 | Sekmakas et al. | 260/29.6 NR |
| 4,167,499 | 9/1979 | Hazan | 260/21 |
| 4,175,018 | 11/1979 | Gacesa | 204/181 T |
| 4,187,204 | 2/1980 | Howard | 260/22 CB |
| 4,246,089 | 1/1981 | Hazan | 204/181 C |

FOREIGN PATENT DOCUMENTS 1303480 1/1973 United Kingdom .

Primary Examiner—John Kight, III
Assistant Examiner—Amelia B. Yarbrough
Attorney, Agent, or Firm—Richard H. Burgess

[57] ABSTRACT

A cationic electrocoating composition containing a polyhydroxyamine and acrylic or methacrylic polymers and optionally a crosslinker resin.

13 Claims, No Drawings

4,338,235

ELECTROCOATING COMPOSITION WITH POLYHYDROXYAMINE AND ACRYLIC OR METHACRYLIC POLYMERS

CROSS REFERENCE TO RELATED APPLICATION

This application is a continuation-in-part of application Ser. No. 106,256 filed Dec. 21, 1979, now abandoned.

BACKGROUND OF THE INVENTION

The present invention relates to copolymers and compositions suitable for cathodic electrodeposition of polymeric coatings. Furthermore, it relates to a method of cathodic electrodeposition of such copolymers.

It is known that organic coatings can be electrodeposited either on an anodically-charged conducting substrate or on a cathodically-charged substrate. Although most of the earlier work in electrodeposition was done with anodic deposition, that type of process has certain disadvantages. Anodic electrodeposition is normally done in a coating bath having a basic pH. The pH decreases at the surface being coated, creating conditions which, when combined with the electrolytic action of the coating bath, can cause the dissolution of substrate metal ions and their subsequent deposition in the coatings being formed. This can be a source of staining and diminished corrosion resistance. Also, electrolysis tends to attach preformed phosphate coatings on the anode. Furthermore, oxygen formed at the anodic substrate being coated can cause a variety of difficulties such as degradation of coatings by oxidation.

Electro-endoosmosis tends to expel water from anodic coatings being formed, leading to low water retention with about 85–95% solids in the coatings. This is an advantage over cathodic coating in which this phenomenon would not be expected to be helpful. (Parts and percentages herein are by weight except where indicated otherwise.)

Cathodic electrodeposition has developed more slowly, due in part to the usually acidic pH of the bath. Also, water tends to be drawn into the coatings and held there, along with acid residues from the bath. It is apparent that this can lead to difficulties in the coatings. In contrast to the oxygen formed at anodes in anodic electrodeposition, hydrogen is formed at the cathode in cathodic electrodeposition. Even though this hydrogen can cause pinholes in coatings, it, of course, does not cause oxidative film degradation.

Processes and compositions for the cathodic electrodeposition of paints are described in U.S. Pat. No. 2,345,543—Wohnsiedler, et al. (1944), which uses a cationic melamine-formaldehyde resin, and in U.S. Pat. No. 3,922,212—Gilchrist (1975), among others. Gilchrist is directed to a process for supplementing the bath composition with a make-up mixture of materials containing an ionizing acid that is not consumed at as fast a rate as the resin. The acid is present in the make-up at lower concentrations than are used in the bath, so as not to build up the concentration of the acid in the bath. Gilchrist uses particular amino-alcohol esters of polycarboxylic acids and discloses that acrylic polymers can be codeposited with zinc phosphate from solution on a cathodic substrate at low pH's such as 2.7 with phosphoric acid or volatile organic acids as the ionizing acid. Higher pH levels would be desirable for minimizing corrosion of coating equipment, especially if volatile nonpassivating acids are used for solubilization instead of phosphoric acid.

Two U.S. patents dealing with nitrogen-based copolymers and their cathodic electrodeposition are U.S. Pat. Nos. 3,455,806 and 3,458,420, both to Spoor, et al. (1969). Cathodic sulfonium systems are described by Wessling et al. on pages 110–127 of "Electrodeposition of Coatings," Ed. E. F. Brewed, American Chemical Society (1973).

Electrodeposition processes have been frequently described in the literature. Two useful reviews of the technology are: "Electro-painting Principles and Process Variables," Brower, Metal Finishing, September, 1976, p. 58; and "Coatings Update: Electrocoating," Americus, Pigment and Resin Technology, August, 1976, p. 17.

U.S. Pat. No. 4,167,499—Hazan, issued Sept. 11, 1979, discloses acrylic polyamine copolymers with fatty acids and epoxy esters for use in cathodic electrocoating. U.S. Pat. No. 3,869,366—Suzuki, et al., discloses cathodic electrocoating systems using a cationic acrylic epoxy amine resin to codeposit nonionic powders.

Cathodic electrocoating systems are based on alkaline cationic resins that are solubilized or dispersed in water with the aid of an acid. In order to minimize corrosion of tank construction materials, it has been the aim of the industry to develop technology that will result in cathodic systems that are stable in water at close to neutral pH. This could be achieved by incorporating in the cationic resin strong alkaline functionality such as quaternary ammonium salts, primary or secondary amines, or combinations thereof and solubilizing the resin in water by neutralizing the amine with a weak acid—usually an organic acid. Because of the high basicity of the deposited film, one of the major problems in the development of such cathodic systems has been to obtain adequate cure, using conventional aminoplasts as crosslinking agents, at relatively low temperatures of 150°–175° C., which are important for various applications such as in the automotive industry. The difficulty in obtaining adequate cure is caused by the fact that the crosslinking of conventional aminoplasts of the melamine benzoguanamine or urea formaldehyde type requires acid catalysis and is strongly inhibited by a basic environment. For this reason, technologies have been developed for cathodic systems that use partially or fully blocked isocyanates as the curing agents. The crosslinking of isocyanates is base-catalysed and requires a basic environment. Isocyanate crosslinking has several shortcomings, including the need for unusually high temperature or catalysts to unblock the isocyanate, high cost, and toxicity of raw materials and possibly of oven effluent during bake. It has been felt that the cathodic electrocoating technology will be at a disadvantage if it is restricted to such mechanisms of cure.

None of the prior art provides a fully-satisfactory composition for cathodic electrocoating at nearly neutral pH with the ability to cure at relatively low temperatures and times, with or without a crosslinking agent.

SUMMARY OF THE INVENTION

The present invention provides an aqueous coating composition comprising a first polymer, a second polymer and optionally a nitrogen resin crosslinker, said coating composition containing, by weight based on the first and second polymers, about 20–70% of a first polymer which is a copolymer comprising a backbone and a graft pendent to the backbone, said backbone containing amine functional groups and hydroxy functional groups, characterized in that said backbone contains at least about 0.13 equivalent of amine groups per 100 grams of first polymer and at least about 0.03 equivalent of hydroxyl groups per 100 grams of first polymer, and containing, by weight, the equivalent of about:
  (a) 35-90% amine functional monomers,
  (b) 10-60% hydroxy functional monomers,
  (c) 0-40% nonfunctional acrylic or methacrylic monomers, and
  (d) 0-5% chain-terminating monomers
the total of (a), (b), (c) and (d) being 100% of said backbone,
said graft comprising a monoglycidyl ester of at least one tertiary carboxylic acid containing 9-20 carbon atoms and being grafted to said amine groups in said backbone, said copolymer containing about 1-30% by weight of said graft, and, by weight based on the first and second polymers, about 80-30% of a second polymer which is acrylic or methacrylic polymer resulting from polymerization with the vinyl unsaturation of acrylic or methacrylic acid ester, said polymer having an acid number of about zero and containing hydroxy functionality.

In more preferred embodiments of the invention, the first polymers are copolymers which consist essentially of, by weight, about:
  (a) 40-60% amine functional monomers,
  (b) 15-40% hydroxy functional monomers,
  (c) 5-20% nonfunctional acrylic or methacrylic monomers, and
  (d) 0.5-3% chain-terminating monomers selected from mercaptoethanol and dodecylmercaptan
said polymer containing at least about 0.25 equivalent of amine groups per 100 grams of polymer and at least about 0.15 equivalent of hydroxyl groups per 100 grams of polymer.

The first polymer of a preferred embodiment contains, by weight, about:
  (a) 59% tertbutyl ethyl amino methacrylate,
  (b) 28% hydroxy ethyl methacrylate,
  (c) 12% ethyl acrylate, and
  (d) 1% mercaptoethanol,
said polymer containing about 0.32 equivalent amine groups per 100 grams of polymer and about 0.22 equivalent hydroxyl groups per 100 grams of polymer.

Other embodiments of the invention also contain 0-30% of a glycidyl ester of at least one tertiary carboxylic acid containing 9-11 carbon atoms, preferably about 25%. The glycidyl ester is reacted with the amine functionality of the hydroxy amine copolymer described above, to form a graft copolymer. The percentages are by weight based on the acrylic polyamine copolymer.

Compositions of the invention can be formulated to make coating compositions with a nitrogen resin crosslinker, preferably benzoguanamine, urea-formaldehyde or melamine-formaldehyde resins; as an ionizing agent, organic or inorganic acid, preferably lactic, acetic, succinic, citric or phosphoric acids, present in an amount to give a pH of 6.0 to 7.0; and a liquid carrier, preferably an aqueous liquid carrier. Since the copolymers described above can crosslink themselves effectively, the nitrogen resin crosslinker can be omitted.

Although compositions of the invention are mainly intended for use in cathodic electrocoating, they can also be used in other ways such as for compositions to be applied by spraying or other conventional techniques.

DETAILED DESCRIPTION OF THE INVENTION

The invention provides basically a universal polymeric cationic dispersant which can be used as such for cathodic electrodeposition, or it can be used to codisperse major portions of hydrophobic auxiliary polymers in an aqueous electrocoating formulation. This can be done without undesirably high molecular weights which would interfere with flow of films formed upon curing of the coatings.

The polymer of this invention is preferably used as a backbone polymer with a graft on it of a glycidyl ester of a carboxylic acid, such as "Cardura E" produced by Shell Chemical Co. The resulting graft copolymer, which is the preferred polymeric dispersant, can be used to advantage in a formulation with a codispersed phase of an epoxy resin reacted with an entity selected from the group consisting of alkyl phenols, alkyl alcohols and alkyl hydroxy ethers, with 1-20 carbon atoms in the alkyl groups, hydroxyamines, fatty amines and mercaptans. Such formulations can also advantageously include conventional crosslinkers such as benzoguanamine, urea- or melamine-formaldehyde. Although various types of crosslinking can take place in the coating film as it cures, for convenience one can refer to the backbone polymer as the first polymer, the graft copolymer as the graft, the selected entity as the second polymer, and the conventional crosslinker as the crosslinker.

In addition to or instead of the second polymer discussed above, one could use acrylic or methacrylic polymers resulting from polymerization with the vinyl unsaturation of acrylic or methacrylic acid, said polymers having an acid number of about zero and containing hydroxy functionality for crosslinking in the curing of coatings made with the composition; polyesters or alkyds having an acid number of zero and containing hydroxy functionality or vinyl groups for crosslinking in the curing of coatings made with the composition; or polybutadiene. Polybutadienes are well known in the art, and suitable ones are described in U.S. Pat. No. 4,096,106—Kita (1978).

In order to increase the pH of a cathodic electrocoating system without adversely affecting the cure response, using conventional aminoplasts such as benzoguanamine, urea formaldehyde and melamine formaldehyde resins as crosslinkers and obtaining satisfactory cures at about 150°-175° C., a new approach in the stabilization of the cathodic dispersion has been undertaken.

This approach minimizes the basicity inside the dispersion particle and maximizes it on the outside of the particle by controlling the coiling characteristics of the cationic polymer. This can be achieved by incorporation of the amine functionality on a flexible hydrophilic backbone with pendant hydrophobic epoxy ester groups so that most of the basic groups will be on the outside of the dispersion particle for maximum pH in the water phase and minimum basicity inside the particle for minimum inhibition of cure response of the deposited film. Hydrophobic epoxy auxiliary polymers can be codispersed by coiling the hydrophilic backbone copolymer of the invention around such pendent auxiliary polymers.

The present invention provides cathodic systems which avoid limitations of isocyanate systems and have good cure response with conventional aminoplasts at temperatures of 150°-175° C. Dispersions with a pH of 6-7 are used, giving a deposited film with a pH of 7-10. The invention is based on a hydrophilic/hydrophobic graft system, with the hydrophilic backbone being a polyamine with hydroxy functionality, with some of the hydroxy groups preferably positioned as terminal hydroxy functionality at the end of the backbone molecule. Such a polyamine is preferably made from vinyl unsaturated acrylate and/or methacrylate esters of acrylic and/or methacrylic acid. This permits good control over the composition and structure of the backbone for optimum properties.

For optimum performance of the polyamine backbone (better dispersion stability and better film properties of the deposited film), a low molecular weight monoepoxy ester of the "Cardura E" type is grafted onto the polyamine backbone by reacting the epoxy group with part of the secondary amines on the backbone to form tertiary amine. Preferably, a "Cardura E" monoepoxy ester is used. This is a glycidyl ester of a tertiary carboxylic acid containing 9-11 carbon atoms, preferably "Versatic 911" acid. Both are produced by Shell Chemical Co. Unless stated differently, the acrylic polyamine backbone referred to here as a polymeric dispersant contains the "Cardura E" graft.

The polyamine backbone could also be made from other constituents such as polypropylene amine and/or polypropylene imine partially reacted with ethylene oxide in order to add further hydroxy functionality.

The hydrophobic part that is codispersed with the polyamine backbone is preferably an epoxy resin that is the reaction product of bisphenol-A and epichlorohydrin made by Shell Chemical Co., blocked with an entity selected from the group consisting of alkyl phenols, alkyl alcohols and alkyl hydroxy ethers, with 1-20 carbon atoms in the alkyl groups (such as nonylphenol), hydroxyamines, fatty amines and mercaptans at molar ratios of epoxy/blocking agent of 1/0-½. The blocked epoxy resin is formed by the reaction of the entity with the epoxy group in the presence of a catalyst. The codispersion of the epoxy blocked resin with the polyamine backbone (without grafting it on the backbone) enables us to obtain a system that is in total lower in molecular weight thus having better electrocoatability and film properties without adversely affecting the hydrophilic/hydrophobic principle important for this invention as described below.

The advantage of this approach is the ability to use the second polymer without it being necessary for it to have grafting sites for its stabilization in the total system, and any variety of polymers can be used so long as they contain the required amine groups and the hydroxy functionality as cross-linking sites.

Desirable characteristics of the hydrophobic/hydrophilic system that permit the use of conventional aminoplasts with good cure response include the following:

(a) The hydrophilic backbone, the hydroxy-containing polyamine, acts as a stabilizer (dispersant) by wrapping itself around the hydrophobic portion of the graft copolymer when dispersed in water. This gives maximum pH in the water phase and maximum dispersion stability with minimum amount of amine functionality. The alkaline functionality is mostly on the outside of the particle, and there is very little inhibition to cure in the larger hydrophobic portion of the particle, the grafted and codispersed blocked epoxy resin. By crosslinking the hydrophobic portion of the total system with an aminoplast a good cure response is obtained of the total system at baking temperatures of 150°-177° C. This is partly because the polyamine has a self-crosslinking capability, mainly due to transesterification of the hydroxy functionality with the acrylate esters. Such a reaction is catalyzed by the strong basic environment caused by the amine functionality. The backbone will self-crosslink by the above mechanism readily at relatively low temperatures of 120°-150° C.

(b) In order to obtain a stable dispersion at pH 6-7, part of the amine functionality is primary and/or, preferably, secondary amines. The minimum desirable amount of such an amine is 0.13-0.39 equivalents per 100 grams of backbone.

(c) The hydroxy functionality on the polyamine backbone has a very important role. It contributes the hydrophilicity of the backbone, discussed in (a) above, and it introduces crosslinking sites for both transesterification in the preferred acrylic polyamine described in this invention and for crosslinking by the aminoplast mechanism. It is desirable that the backbone have a level of hydroxy functionality of at least about 0.4 equivalents per amine equivalent in the backbone. With increasing amounts of amine, it is desirable also to have increasing amounts of hydroxyl groups because amines would otherwise inhibit crosslinking.

Preferably the copolymer contains enough glycidyl epoxy to react with 0.05 amine equivalents, more preferably about 0.1-0.2 amine equivalents, and sometimes optionally about 0.12 amine equivalents.

A preferred composition of the invention can be made as follows, with the structural formulae schematically indicated.

The acrylic polyamine backbone is made by copolymerizing, in parts by weight:

12 ethyl acrylate/59 tertiary butyl aminoethyl methacrylate/28 hydroxyethyl methacrylate/1 mercaptoethanol. This copolymer is grafted with "Cardura E" in proportions of 75% copolymer, 25% "Cardura E" to give a backbone of:

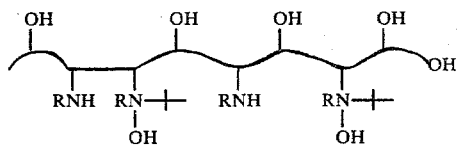

This graft copolymer representing the desired composition of the universal dispersant is used to codisperse a hydrophobic polymer consisting of an adduct of Epon 1001 and nonyl phenol at a ratio of 1/1-1/1.0 or preferably 1/1.7 and proportions of 43% dispersant, 57% epoxy adduct.

The codispersed reaction product comprises:

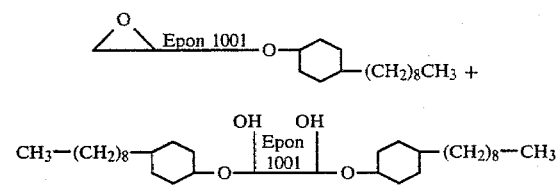

and small amounts of 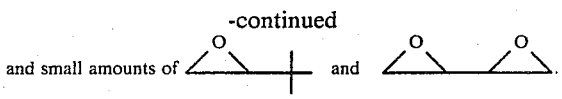

For the preferred composition, the acrylic polyamine resin is reacted with "Cardura E" in a weight ratio of 75 acrylic to 25 "Cardura E".

A coating composition is made from a clear formulation, in parts of solids content by weight, of:

67 resin/33 XM 1125 crosslinker, which is neutralized to 50% of stoichiometric with lactic acid, with water added.

More specifically, one can use 222 parts resin containing the codispersed diadduct of epoxy and fatty acid, 70 parts XM 1125 crosslinker, 9 parts 85% lactic acid, and 1700 parts water.

Coating compositions of the invention can be cathodically electrodeposited either on pretreated metal such as phosphatized steel or on bare metal such as steel which has been cleaned but not phosphatized. It can also be used on other metal substrates containing zinc, such as galvanized steel, as well as on aluminum and various alloys.

The lack of practical success of several previous cathodic electrodeposition painting processes is due at least in part to the amount of water that is held in the resin coating and the acids and salts that are dissolved in that water, not readily removable from the coating. The water can lead to coating failure by various mechanisms, and the acid residues can encourage subsequent corrosion, either directly or by providing a hygroscopic material in the coating which encourages penetration of water and other corrosive agents.

In contrast to the useful effect of electroendoosmosis at the anode in anodic electrodeposition of paint which tends to expel water from an anodic coating, water is not electrically expelled from a cathodic coating and may actually be drawn into the coating by electrical forces. However, water held in a cathodic coating can be particularly undesirable. To minimize such effects, the present invention provides resins with a degree of hydrophobicity and hardness or denseness of the coating which combine to expel water from the coating as the coating is formed.

The desirable effects of the invention are achieved by using certain hydrophobic copolymers that can be considered to be universal dispersants, which contain in their backbone portions hydroxy groups and amine functionality, preferably secondary and/or tertiary. Such functionality introduces an alkaline mechanism of adhesion of the resin coating to the substrate even after heating the deposited coatings to cause them to crosslink. This has been found to improve corrosion resistance of coatings when compared to coatings using an acidic mechanism of adhesion introduced by carboxylic groups such as in an anodic electrocoating system. This is an advantage over cathodic systems stabilized by onium groups, such as sulfonium and quarternary ammonium, in which hydrophobicity is only developed after thermal decomposition of the onium groups. Such delayed hydrophobicity is unavailable for squeezing water out of a newly formed wet coating. Thermal decomposition of onium groups during crosslinking of the film would also make them unavailable for enhancing adhesion of the resin coating to the substrate.

In the process of the invention, although there are advantages in using live entry, in which the coating voltage is applied while the articles to be coated are being immersed into the bath, it will be apparent that reduced voltage can be applied upon entry if desired for certain special effects. However, the additional electrical apparatus required for reduced voltage entry is not normally necessary or desirable. It is desirable for the coated substrate to be removed from the bath with the coating voltage still applied or soon after it is turned off.

For operating electrocoating baths of the invention, the tank can be lined with an organic coating resistant to the mildly-acidic pH of the bath, and stainless steel or plastic piping and pump parts can be used to minimize corrosion. However, carbon steel parts and piping usually can be used as a material of construction without a corrosion problem.

Ultrafiltration can be used by recirculating the bath components to rinse contaminants and drag-out from the coated parts. Either membranes and ordinary flushed anodes or an acid deficient feed can be used, as is known in the art, to minimize the build-up of acid in the coating bath.

Although an uncoated tank can be used as the anode, in commercial practice one would normally use stainless steel anodes having a surface area smaller than that of the cathodic substrate which is to be coated. This gives a favorable current density distribution.

In the novel electrocoating process, the metal article providing the substrate to be coated is immersed in a bath of an electrocoating cell. The bath is an aqueous dispersion of preferably about 2–35% by weight of a cationic film-forming polymer at least partially neutralized with an organic acid which is volatile at the temperatures used to crosslink the paint film. Suitable acids include lactic, acetic, succinic and citric acids. Preferably lactic acid is used in an amount of from 30% of that required for stoichiometric reaction of the hydrogen of the acid with all of the available amine group bonds in the polymer to about 100% of stoichiometric. It is more preferable to use about 50%. The use of less than about 30% of the stoichiometric amount of acid can lead to instability in the bath. More than 100% can lead to undesirable excess acidity in the bath with consequent corrosion of coating equipment. The preferred pH of the coating bath is about 6.5–7.0.

The metal article is connected to the negative side of a direct current (D.C.) power source to become the cathode of the cell. A voltage of about 1 to 550 volts is passed through the cell for the full dwell time of the article in the bath, about 0.01 to 5 minutes, preferably 2 minutes, and a coating of the cationic polymer is deposited. When the coating reaches the desired thickness, the article is removed from the bath. Preferably, the article is rinsed with water and/or with ultra-filtrate taken from the bath, to remove excess coating. Then the article is dried at ambient temperatures or baked for about 5 to 40 minutes at about 100° to 200° C., preferably about 30 minutes at 175° C., to give a finished coating about 0.1 to 5 mils thick. Typical efficiencies of about 30 mg film solids deposited per coulomb of electricity are obtained.

The current density used in the electrocoating cell generally does not exceed 1.85 amperes/cm$^2$ (0.3 amperes/in$^2$) of anode surface which is immersed in the bath, and it is preferable to use lower current densities. In the deposition of the cationic film-forming polymer, voltages of 5 to 400 for 0.25 to 2 minutes are preferred to form a high-quality finish.

Coating compositions of the present invention can contain pigments. The pigments are normally added to the composition in the usual manner by forming a mill base or pigment dispersion with the pigment and the afore-mentioned cationic film-forming polymer or another water-dispersible polymer or surfactant. This mill base is then blended with additional film-forming constituents and the organic solvents. When the mill base is subsequently acidified and dispersed in water, the polymers tend to wrap themselves around the pigments. This has the effect of preventing destabilization of the dispersion or other undesirable effects that could come from using a basic pigment such as $TiO_2$ or lead silicate in an acid stabilized dispersion. Other pigments that could be used include metallic oxides such as zinc oxides, iron oxides, and the like, metal flakes such as aluminum flake, metal powders, mica flakes with and without surface treatment such as with titania and carbon black, chromates such as lead chromates, sulfates, carbon black, silica, talc, lead silicates, aluminum silicates including china clay and finely divided kaolin, organic pigments and soluble organic dyes.

Aside from cathodic electrodeposition, the novel coating compositions of the present invention can also be applied by any conventional method such as spraying, electrostatic spraying, dipping, brushing, flowcoating and the like. Reaction of the amine groups of the polymer with an acid is generally not necessary when the coating composition is to be used for purposes other than electrodeposition. Other organic thermally-decomposable acids, such as formic acid, can be used to obtain water solubility for such purposes. The coating would then be baked for about 5 to 40 minutes at about 150° to 200° C. to give coatings of about 0.1–5 mils thickness. When applied by cathodic electrodeposition, coating compositions of the invention are preferably applied to give dried thicknesses of about 0.8–1.2 mils.

A valuable attribute of this invention is the ability to crosslink a cationic resin which is alkaline in nature with conventional nitrogen formaldehyde resins which usually require an acidic environment as a catalyst, with curing at temperatures of 150°–175° C. A crosslinking agent which can be water dispersed along with the film-forming constituent is used in the coating composition. Based on the proportions of solids in the bath, which are roughly equal to the proportions of solids in the film, about 60 to 95%, preferably about 70%, of cationic film-forming polymer are used along with about 5 to 40%, preferably about 30%, of crosslinking agent.

Typical crosslinking agents that can be used with the invention are melamine formaldehyde, alkylated melamine-formaldehyde resins such as hexakis-(methoxymethyl) melamine and partially-methylated melamine formaldehyde resins, butylated melamine formaldehyde resins, methylated urea-formaldehyde resins, urea-formaldehyde resins, phenol-formaldehyde and the like. One particularly useful crosslinking agent which forms a high-quality product with the cationic polymers is a benzoguanamine-formaldehyde resin used in conjunction with a urea-formaldehyde resin such as Beetle 80, produced by American Cyanamid Co. A preferred benzoguanamine formaldehyde resin is XM 1125, also produced by American Cyanamid Co.

When the novel compositions of this invention are used as primers over metals including treated and untreated steel, aluminum and other metals, conventional acrylic enamels, acrylic dispersion enamels and other coting compositions can be applied directly as topcoats over such primers. Acrylic lacquers, acrylic dispersion lacquers, and acrylic powder coatings can be applied over the novel compositions, but a suitable intermediate coat such as a sealer can be used to improve adhesion of the lacquer or powder topcoats to the primer.

The epoxy adduct used in compositions of the invention contributes sufficient hydrophobicity to the polymer so that the electrodeposited film contains at least about 83% solids, and preferably 85 to 95% solids. Although such high solids levels are not uncommon for anodically-deposited coatings, they are not readily achieved in cathodic electrodeposition because of the amount of water usually entrapped.

Compositions of the invention can include additional adjuvants that do not materially change the basic and novel characteristics of the invention and thus are within the scope of "consisting essentially" terminology. Some such adjuvants are thickeners, defoamers, pigments, microgels, pigments dispersants, polymeric powders, microbiocides, and coalescing solvents. Typical coalescing solvents which might be used at a concentration of about 0.5% of the total bath volume are ethylene glycol monobutyl ether, diethylene glycol monobutyl ether, cyclohexanol and hexycellosolve.

Although it is difficult to meaningfully quantify the softness or hardness of the resin, it is known that certain resins of the invention have a degree of hardness which is useful in combination with the hydrophobicity characteristics of the resins in forcing water out of films to obtain the indicated levels of retained water and acid.

The molecular weights of polymers of the invention are generally not critical. However, typical average molecular weights determined by gel permeation chromatography are: for the acrylic-amine backbone portion—10,000 to 12,000, for the epoxy-fatty acid portion—1,500 to 3,000, and for the reacted graft copolymer—about 12,000.

Although thoughts are expressed herein on why an how the advantages of the invention are obtained, the invention is defined by the claims and does not depend upon theories.

Specific examples will now be given of the preparation of graft copolymers of the invention and their use in cathodic electrodeposition processes of the invention.

BEST MODE

Depending on the properties sought, the invention has various best modes, illustrated by the examples.

EXAMPLE I

| Polymerization of Acrylic Polyamine Dispersant | |
|---|---|
| | Parts by Weight |
| Portion I | |
| Isopropyl alcohol | 285.81 |
| Portion II | |
| Ethyl acrylate | 53.70 |
| Tertbutylamino ethyl methacrylate | 264.92 |
| Hydroxy ethyl methacrylate | 125.30 |
| Mercapto ethanol | 7.16 |
| Portion III | |
| Isopropyl alcohol | 71.60 |
| Azobisisobutyronitrile | 7.16 |
| Methyl ethyl ketone | 17.90 |
| Portion IV | |
| Methyl ethyl ketone | 5.73 |

| Polymerization of Acrylic Polyamine Dispersant | |
|---|---|
| | Parts by Weight |
| Azobisisobutyronitrile | 0.72 |
| Portion V | |
| Ethylene glycol monoethyl ether | 358.00 |

Portion I is charged into a reaction vessel equipped with a direct mixer, a reflux line condenser, stripping capability and a thermometer. The alcohol in Portion I is brought to reflux (80°–85° C.) and Portions II and III are added simultaneously over a period of 60 minutes. The system is kept at reflux during the addition of Portions II and III and is cooked for a further 60 minutes (under reflux) after the addition is ended. Then Portion IV is added and reflux temperature is maintained for an additional 30 minutes. Then Portion V is added and 350 parts of solvent are stripped off or removed from the system.

EXAMPLE II

| Acrylic Polyamine Dispersant Without Nonfunctional Acrylic Monomer | |
|---|---|
| | Parts by Weight |
| Portion I | |
| Isopropyl alcohol | 1200.00 |
| Portion II | |
| Tertbutylamino ethyl methacrylate | 1110.00 |
| Hydroxy ethyl methacrylate | 525.00 |
| Azobisisobutyronitrile | 30.00 |
| Portion III | |
| Ethylene glycol monoethyl ether | 1200.00 |

Portion I is charged into a reaction vessel equipped as in Example I, the solvent is brought to reflux (80°–85° C.), and then Portion II is added over a period of 60 minutes at reflux temperature. After the addition of Portion II, the system is kept at reflux temperature for one hour, and Portion III is added. The system is brought to reflux, and 1200 parts of solvent are stripped off.

EXAMPLE III

| Acrylic Polyamine Dispersant With Cardura E Graft | |
|---|---|
| | Parts by Weight |
| Portion I | |
| Isopropyl alcohol | 285.81 |
| Portion II | |
| Ethyl acrylate | 53.70 |
| Tertbutylamine ethyl methacrylate | 264.92 |
| Hydroxy ethyl methacrylate | 125.30 |
| Mercapto ethanol | 7.16 |
| Portion III | |
| Isopropyl alcohol | 71.60 |
| Azobisisobutyronitrile | 7.16 |
| Methyl ethyl ketone | 17.90 |
| Portion IV | |
| Methyl ethyl ketone | 5.73 |
| Azobisisobutyronitrile | 0.72 |
| Portion V | |
| Ethylene glycol monobutyl ether | 246.57 |
| "Cardura E-10" (glycidyl ester of epichlorohydrin reacted with versatic acid 911, produced by Shell Oil Co.) | 137.70 |

| Acrylic Polyamine Dispersant With Cardura E Graft | |
|---|---|
| | Parts by Weight |
| Portion VI | |
| Ethylene glycol monoethyl ether | 5.00 |
| Benzyltrimethyl ammonium hydroxide | 3.77 |

Portion I is charged into a reaction vessel equipped as described in Example I. The alcohol in Portion I is brought to reflux (80°–85° C.), and Portions II and III are added simultaneously over a period of 60 minutes. The system is kept at reflux during the addition of Portions II and III and is cooked for a further 60 minutes at reflux after the addition is ended. Then Portion III is added, and reflux temperature is maintained for an additional 30 minutes. Then Portion V is added, and 381 parts of solvent are stripped to enable the system to reach maximum reflux temperatures of 135°–140° C. Then Portion VI is added, and the reaction mixture is cooked for ten hours at 135°–140° C.

EXAMPLE IV

| Acrylic Polyamine Dispersant With "Cardura E" Graft and Without Nonfunctional Acrylic Monomer | |
|---|---|
| | Parts by Weight |
| Portion I | |
| Isopropyl alcohol | 1200.00 |
| Portion II | |
| Tertbutylamino ethyl methacrylate | 1110.00 |
| Hydroxy ethyl methacrylate | 525.00 |
| Azobisisobutyronitrile | 30.00 |
| Portion III | |
| Ethylene glycol monobutyl ether | 1200.00 |
| Cardura E-10 (as in Example III) | 661.00 |
| Portion IV | |
| Benzyl trimethyl ammonium hydroxide | 3.00 |
| Ethylene glycol monobutyl ether | 5.00 |

Portion I is charged into reaction vessel equipped as described in Example I. The alcohol in Portion I is brought to reflux (80°–85° C.), and Portion II is added over the period of 60 minutes at reflux temperature. After the addition of Portion II, the system is kept at reflux temperature for one hour, and Portion III is added. The system is brought to reflux, and 1200 parts of solvent are stripped off. Then Portion IV is added, and the system is cooked at reflux for 5 hours at 150°–160° C.

EXAMPLE V

| Epoxy Resin/Nonylphenol Adduct To Be Codispersed with the Acrylic Polyamine Dispersant | |
|---|---|
| | Parts by Weight |
| Portion I | |
| "DER 661" (Epoxy resin from Dow Chemical) | 440.50 |
| Nonylphenol | 176.20 |
| Portion II | |
| Benzyl trimethyl ammonium hydroxide | 0.43 |
| Portion III | |
| Ethylene glycol monoethyl ether | 263.87 |

Portion I is charged into a reaction vessel equipped with a mixer, thermometer and condenser. The epoxy resin is melted at temperatures of 130°–140° C. Then Portion II is added, and the mixture is cooked at 150°–160° C. for five hours. Then Portion III is added and mixed in for 30 minutes.

EXAMPLE VI

| Preparation of Clear Dispersion of Cathodic Paint | |
|---|---|
| | Parts by Weight |
| Portion I | |
| Acrylic polyamine polymer made in Example III | 102.53 |
| Epoxy nonylphenol polymer made in Example V | 136.70 |
| "Cymel 1125" (American Cyanamid) | 99.92 |
| Portion II | |
| Lactic acid (85%) | 6.59 |
| Portion III | |
| Deionized water | 514.26 |

Charge Portion I into a mixing vessel. Mix for 2 hours. Add Portion II and mix for 1 hour. Add Portion III over the period of 2 hours with continuous agitation.

EXAMPLE VII

| Preparation of Pigment Paste (Mill Base) to be Used in Cathodic Paint | |
|---|---|
| | Parts by Weight |
| Portion I | |
| Resin prepared in Example I | 16.45 |
| Ethylene glycol monoethyl ether | 4.03 |
| Lactic acid (85%) | 3.03 |
| Portion II | |
| Deionized water | 24.74 |
| Portion III - Pigments | |
| Magnesium silicate (diatomaceous earth pigment) | 20.85 |
| Lead silicochromate | 10.79 |
| Lead silicate | 22.80 |
| Carbon black | 2.32 |

Portion I is charged into a mixer and mixed for 30 minutes. Portion II is added over the period of 30 minutes, then Portion III is added, and the total system is mixed for 1 hour. The premix of above ingredients is charged into a conventional sand mill and ground while controlling the temperature of the mixture below 70° C. The resulting pigment paste is self-dispersable in water and has a solids content of 60–62%.

EXAMPLE VIII

| Preparation of Cathodic Paint | |
|---|---|
| Portion I | Parts by Weight |
| Clear dispersion from Example VI | 860.00 |
| Pigment paste from Example VII | 105.00 |
| Deionized water | 880.00 |

The ingredients are added in above order into a mixing tank with continuous agitation. The electrocoating composition has a pH of 6.3–6.8, conductivity of 700–1000 micromhos, pigment-to-binder ratio of about 25/100 and solids of about 24%. It is charged into a stainless steel tank for electrodeposition, and an untreated cold rolled steel panel or a phosphatized steel panel is positioned in the center of the tank, electrically connected to the negative side of a DC power source, forming the cathode of the electrocoating cell. The tank is connected to the positive side of a DC power source, thus forming the anode of the cell. A direct current of 150–400 volts is applied to the cell for two minutes at an ambient temperature of 20°–35° C., and a paint of about 15–20 μm is deposited on the panel. The coated metal panel is removed from the electrocoating cell, washed and baked at about 160° C. for 30 minutes. The resulting primer film has excellent adhesion to the metal substrate, is hard and has very good corrosion and saponification resistance over bare cold rolled steel and phosphatized steel. An acrylic enamel adheres to the primer film, and conventional acrylic lacquers can be applied with conventional sealer coat over the primer to form a high quality finish. The system has excellent throwing power in a blind throw-measuring box of 35.5–38 cm at 350–400 volts.

This coating composition is particularly useful for priming automobile and truck bodies by electrodeposition for maximum corrosion protection over all parts of the car including areas of poor phosphate pretreatment or no pretreatment at all.

EXAMPLE IX

| Acrylic Polymer Used For Durable Finishes To Be Codispersed with the Acrylic Polyamine Dispersant | |
|---|---|
| | Parts by Weight |
| Portion I | |
| Ethylene glycol monobutyl ether | 252.10 |
| Cardura E-10 | 134.82 |
| Portion II | |
| Styrene | 205.18 |
| Butyl acrylate | 146.55 |
| Methacrylic acid | 99.72 |
| Ditertiary butyl perbenzoate | 17.63 |
| Portion III | |
| Cardura E-10 | 177.00 |
| Benzyl trimethyl ammonium hydroxide | 1.50 |

Charge Portion I into a reaction vessel as described in Example I without stripping capability. Bring Portion I to reflux and add Portion II at reflux temperature over the period of 90 minutes. Hold batch at reflux for 2 hours after the addition of Portion II. Add Portion III and cook at reflux (150°–160° C.) for 3 hours.

EXAMPLE X

Polybutadiene Polymer to be Dispersed With the Acrylic Polyamine Dispersant

Example IX is repeated, except that 78.43 parts by weight of polybutadiene is substituted for Portion II.

EXAMPLE XI

Polyester Polymer to be Dispersed With the Acrylic Polyamine Dispersant

Example IX is repeated except that 470 parts by weight of "Ruccoflex" polyester produced by Hooker Chemical Co. is substituted for Portion II.

EXAMPLE XII

| Clear Acrylic Paint Useful As a Finish For Products Such As Aluminum Wheels, Brass Hardware | |
|---|---|
| | Parts by Weight |
| Portion I | |
| Polymer made in Example III | 60.43 |
| Polymer made in Example IX | 78.43 |
| Ethylene glycol monobutyl ether | 5.00 |
| Cymel 1141 (American Cyanamid) | 39.22 |
| Portion II | |
| Lactic acid (85%) | 4.80 |
| Deionized water | 5.20 |
| Portion III | |
| Deionized water | 831.92 |

Portion I is charged to a mixing vessel and mixed for 2 hours. Then Portion II is added and mixed for 1 hour. Then Portion III is added slowly to invert the system into a stable water dispersion with a pH of 6.1 and sensitivity of 1900 ohm-cm. Coating voltages of brass fixtures was 70–120 volts with thickness of deposited film ranging from 15 to 25 μm. The film cures to a hard, glossy, clear finish at 30 minutes in 177° C.

EXAMPLE XIII

| Black Pigment Paste For Acrylic Cathodic Paint | |
|---|---|
| | Parts by Weight |
| Portion I | |
| Polymer made in Example III | 16.50 |
| Ethylene glycol monoethyl ether | 5.61 |
| Portion II | |
| Lactic acid (85%) | 1.45 |
| Deionized water | 1.24 |
| Portion III | |
| Deionized water | 40.00 |
| Portion IV | |
| Magnesium silicate | 21.29 |
| Carbon black | 6.36 |
| Portion V | |
| Deionized water | 7.55 |

Charge Portion I into mixing vessel and mix for 20 minutes. Premix Portion II and add to Portion I. Mix for 20 minutes. Add Portion III to mixing vessel and mix for 30 minutes. Add Portion IV in order into mixing vessel and mix for one hour. Add Portion V to mixing vessel to adjust viscosity to a Stromer viscosity level of about 65 Krebs units. Then grind the mixture using regular sand grinding techniques to a fineness of about 12.5 μm.

EXAMPLE XIV

| Semi-Gloss Black Acrylic Paint Useful As a Single Coat or Primer For Products Such as Farm Equipment, Speakers, Automotive Small Parts | |
|---|---|
| | Parts by Weight |
| Portion I | |
| Polymer made in Example III | 52.66 |
| Polymer made in Example IX | 78.43 |
| "Cymel 1141" (American Cyanamid) | 39.22 |
| Ethylene glycol monoethyl ether | 15.00 |
| Portion II | |
| Lactic acid (85%) | 4.07 |
| Deionized water | 4.24 |
| Portion III | |
| Pigment paste in Example XI | 47.02 |
| 2-ethyl hexanol | 3.00 |
| Portion IV | |
| Deionized water | 881.36 |

Charge Portion I into mixing vessel and mix for 1 hour. Add Portion II (premixed) and mix for 1 hour. Add Portion III in order and mix for 30 minutes. Add Portion IV slowly to invert the total paint system and mix for 30 minutes after the addition of Portion IV is ended. The paint obtained has a pH of 6.1 and resistivity of 1300 ohm-cm at 13% solids.

Iron phosphate and zinc phosphate precoated panels are coated at 75–100 volts with film builds of 0.9–1.0 mil. The specular gloss determined at an angle of 60° by a Hunter D48D gloss meter is 50–60 units. The system cures at 177° C. in 30 minutes.

I claim:

1. An aqueous cathodic electrodeposition coating composition comprising a dispersion of a first polymer, a second polymer, enough of an organic acid to give the composition a pH about in the range of 6 to 7, and optionally a nitrogen resin crosslinker, said coating composition containing, by weight based on the first and second polymers, about 20–70% of a first polymer which is a copolymer comprising a backbone and a graft pendent to the backbone, said backbone containing amine functional groups and hydroxy functional groups, characterized in that said backbone contains at least about 0.13 equivalent of amine groups per 100 grams of first polymer and at least about 0.03 equivalent of hydroxyl groups per 100 grams of first polymer, and containing, by weight, the equivalent of about:
   (a) 35–90% amine functional monomers,
   (b) 10–60% hydroxy functional monomers,
   (c) 0–40% nonfunctional acrylic or methacrylic monomers, and
   (d) 0–5% chain-terminating monomers
the total of (a), (b), (c) and (d) being 100% of said backbone, said graft comprising a monoglycidyl ester of at least one tertiary carboxylic acid containing 9–20 carbon atoms and being grafted to said amine groups in said backbone, said copolymer containing about 1–30% by weight of said graft, and, by weight based on the first and second polymers, about 80–30% of a second polymer which is acrylic or methacrylic polymer resulting from polymerization with the vinyl unsaturation of acrylic or methacrylic acid ester, said polymer having an acid number of about zero and containing hydroxy functionality.

2. The composition of claim 1 containing about 35–50% of said first polymer and 50–60% of said second polymer.

3. The composition of claim 1 wherein said first polymer is a copolymer consisting essentially of, by weight, about:
   (a) 40–50% amine functional monomers,
   (b) 15–40% hydroxy functional monomers, (c) 5–20% nonfunctional acrylic or methacrylic monomers, and
(d) 0.5–3% chain-terminating monomers,
said first polymer containing at least about 0.25 equivalent of amine groups per 100 grams of first polymer and at least about 0.15 equivalent of hydroxyl groups per 100 grams of first polymer.

4. The composition of claim 1, 2 or 3 wherein in said first polymer, the amine functional monomers of (a) are selected from
diethylaminoethyl methacrylate and acrylate,
dimethylaminoethyl methacrylate and acrylate,
tertbutylaminoethyl methacrylate and acrylate,
dimethylaminopropyl methacrylamide and acrylamide
2-, 3-, and 4-vinylpyridine
vinylimidazole
aminoethyl methacrylate and acrylate,
methylaminoethyl methacrylate and acrylate,
ethylaminoethyl methacrylate and acrylate,
hydroxyethylaminoethyl methacrylate and acrylate,
di(hydroxyethyl)aminoethyl methacrylate and acrylate;
the hydroxy-functional monomers of (b) are selected from hydroxyethyl acrylate and methacrylate and hydroxypropyl acrylate and methacrylate;
the nonfunctional arylic or methacrylic monomers of (c) are selected from styrene acrylate and methacrylate and alkyl acrylates and methacrylates with 1–10 carbon atoms in the alkyl, and
the chain-terminating monomers are selected from mercaptoethanol and dodecylmercaptan.

5. The composition of claim 1, 2 or 3 wherein the first polymer contains, by weight, about:
(a) 59% tertbutylethylamino methacrylate,
(b) 28% hydroxyethyl methacrylate,
(c) 12% ethyl acrylate, and
(d) 1% mercaptoethanol,
said polymer containing about 0.32 equivalent amine groups per 100 grams of polymer and about 0.22 equivalent hydroxyl groups per 100 grams of polymer.

6. The composition of claim 1, 2 or 3 wherein the first polymer contains, by weight, about:
(a) 69% tertbutylethylamino methacrylate and
(b) 31% hydroxyethyl methacrylate.

7. The composition of claim 1, 2 or 3 wherein, in the second polymer, the selected entity is acrylic polymers made wih acrylic monomers having 3–10 carbon atoms.

8. The composition of claim 1, 2 or 3 wherein, in the second polymer, the selected entity is methacrylic polymers made with methacrylic monomers having 4–11 carbon atoms.

9. The composition of claim 1, 2 or 3 wherein said first polymer comprises a backbone having grafted onto it, based on the weight of said backbone, about 0–50% of a glycidyl ester of at least one tertiary carboxylic acid containing 9–11 carbon atoms.

10. The composition of claim 1, 2 or 3 wherein the crosslinker polymer is selected from benzoguanamine, urea formaldehyde and melamine formaldehyde and is present in an amount of about 30–70% by weight, based on the weight of the first and second polymers.

11. The composition of claim 8 wherein the crosslinker polymer is benzoguanamine, present in an amount of about 45–50%.

12. The composition of claim 1 wherein said composition has a pH about in the range of 6.5 to 7.0.

13. The composition of claim 1 wherein said copolymer is present in the form of dispersed particles having a higher pH at the surface of said particles than inside said particles.

* * * * *